US007054885B1

(12) United States Patent
Hoffman et al.

(10) Patent No.: US 7,054,885 B1
(45) Date of Patent: May 30, 2006

(54) METHOD AND SYSTEM FOR MANAGING THE CONFIGURATION OF AN EVOLVING ENGINEERING DESIGN USING AN OBJECT-ORIENTED DATABASE

(75) Inventors: Leonard R. Hoffman, Bloomington, MN (US); Duane L. Corpe, Mt. Vernon, IA (US); Rex O. Albers, Cedar Rapids, IA (US)

(73) Assignee: Rockwell Collins, Inc., Ceder Rapids, IA (US)

( * ) Notice: Subject to any disclaimer, the term of this patent is extended or adjusted under 35 U.S.C. 154(b) by 0 days.

(21) Appl. No.: 09/576,187

(22) Filed: May 23, 2000

(51) Int. Cl.
*G06F 17/30* (2006.01)
(52) U.S. Cl. .................................................. 707/103 Y
(58) Field of Classification Search ................ 707/203, 707/200, 103, 103 X, 103 R, 103 Y, 103 Z, 707/8; 709/220
See application file for complete search history.

(56) References Cited

U.S. PATENT DOCUMENTS

| | | | | |
|---|---|---|---|---|
| 4,853,843 A | * | 8/1989 | Ecklund | 707/203 |
| 5,553,282 A | * | 9/1996 | Parrish et al. | 707/10 |
| 5,659,735 A | * | 8/1997 | Parrish et al. | 707/10 |
| 5,680,615 A | * | 10/1997 | Marlin et al. | 707/103 R |
| 5,734,899 A | * | 3/1998 | Yoshizawa et al. | 707/203 |
| 5,956,719 A | * | 9/1999 | Kudo et al. | 707/10 |
| 6,108,669 A | * | 8/2000 | Dalenberg et al. | 707/203 |
| 6,122,633 A | * | 9/2000 | Leymann et al. | 707/10 |
| 6,449,624 B1 | * | 9/2002 | Hammack et al. | 707/203 |
| 6,460,052 B1 | * | 10/2002 | Thomas et al. | 707/203 |
| 6,505,212 B1 | * | 1/2003 | Nakano et al. | 707/200 |
| 6,834,285 B1 | * | 12/2004 | Boris et al. | 707/103 R |

OTHER PUBLICATIONS

"Implementation of Checkout/Checkin Mechanism on Object-Oriented Database Systems" by Hyun-Ju Park and Suk I. Yoo, IEEE 1996.

* cited by examiner

*Primary Examiner*—Greta Robinson
(74) *Attorney, Agent, or Firm*—Nathan O. Jensen; Kyle Eppele

(57) ABSTRACT

A system and method for providing configuration management support for an engineering design, the system using an object-oriented database and private workspace to provide for change isolation. The creation of the private workspace is accomplished with a novel "ownership only" full copying approach which is efficient with respect to disk storage space and consumption of computing resources, especially where the database includes many small items which are under configuration management.

7 Claims, 8 Drawing Sheets

METHOD AND SYSTEM FOR MANAGING THE CONFIGURATION OF AN EVOLVING ENGINEERING DESIGN USING AN OBJECT-ORIENTED DATABASE

FIELD OF THE INVENTION

The present invention generally relates to configuration management systems, and more particularly relates to configuration management systems using an object-oriented database, and even more particularly relates to methods and systems for managing the configuration of an evolving design using an object-oriented database.

BACKGROUND OF THE INVENTION

In recent years, use of computer aided design (CAD) and computer-aided system engineering (CASE) has become increasingly prevalent in many industries. It is not uncommon today to have industries where scores of designers work toward a common goal of creating a new product design. It is equally as common to have these designers continuously working to upgrade or otherwise adapt a pre-existing design into one or more related designs. One example of such an effort is avionics system engineering, where new and revised products are continuously being created and changed. One integral part of this avionics development is the maintenance of software and hardware interface definitions. These interface definitions are commonly referred to as Interface Control Documents (ICDs). It is becoming increasingly important to be able to efficiently capture, use, share and reuse these ICDs electronically. In order to re-use ICDs, at varying component levels, an ICD tool needs to be able to create higher level components from lower level building blocks. For example, an ICD tool would preferably be able to define a new message from pre-existing labels or define a new port from pre-existing messages. A full configuration management system that allows versioning and baseline management of data within a database would be most helpful to such avionics designers. Correlation of this information to internal and external deliveries would be most helpful as well.

While configuration management solutions have been used extensively in the past with many engineering design tasks, there heretofore has not been any solution which allows full configuration management of engineering design information in a computerized database. Some configuration management solutions are able to manage computer files; however, they typically know very little, or nothing, about the content or semantics of those files. When they have some knowledge of the files, it is usually limited to generic characteristics of ASCII files. These CM systems are not capable of digging into a database file, understanding both process and model schemata and reading and updating database data. It has been proposed, in some academic articles, that an object-oriented database be used to perform the configuration management and database functions of such engineering design efforts. In articles entitled "*Implementation of a Version Manager on an Object-Oriented Database Management System*" by Hyun-Ju Park and Suk I. Yoo (hereafter Park 1), and "*Implementation of Checkout/Checkin Mechanism on Object-Oriented Database Systems*" by Hyun-Ju Park and Suk I. Yoo, IEEE 1996, (hereafter Park 2), it has been proposed to use a checkout/checkin mechanism for use with object-oriented data base management systems (ODBMSs).

While this approach has been investigated extensively in the past, it does have some drawbacks. One predominant drawback is that Park 1 and Park 2 teach that when a single object of a composite object is checked out into a private work place, that it involves the creation of a table of reference points for each object within the composite object. Under certain circumstances, this can have serious disadvantages in that it requires much storage space and consumes considerable processor time.

Consequently, there exists a need for improved methods and systems for providing configuration management solutions which use ODBMSs.

SUMMARY OF THE INVENTION

It is an object of the present invention to provide a system and method for providing, in an efficient manner, a robust configuration management solution using ODBMSs.

It is a feature of the present invention to utilize a sharing or aliasing, between different versions of the same item, of common unchanged owned items.

It is an advantage of the present invention to achieve improved efficiency in configuration management functions of engineering tasks, where concurrent engineering is common, and an ODBMS is used.

The present invention is an apparatus and method for providing configuration management solutions in an ODBMS, which is designed to satisfy the aforementioned needs, provide the previously stated objects, include the above-listed features, and achieve the already articulated advantages. The present invention is carried out in a "wasted resource-less" manner in a sense that the time and space consumed with creating pointers for every component in a complex object have been eliminated. Accordingly, the present invention is a system and method including an ODBMS where owned objects can have multiple owners and where editing of a component of a composite object requires that only the edited component and the components directly and indirectly owning the component be copied into a workspace.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
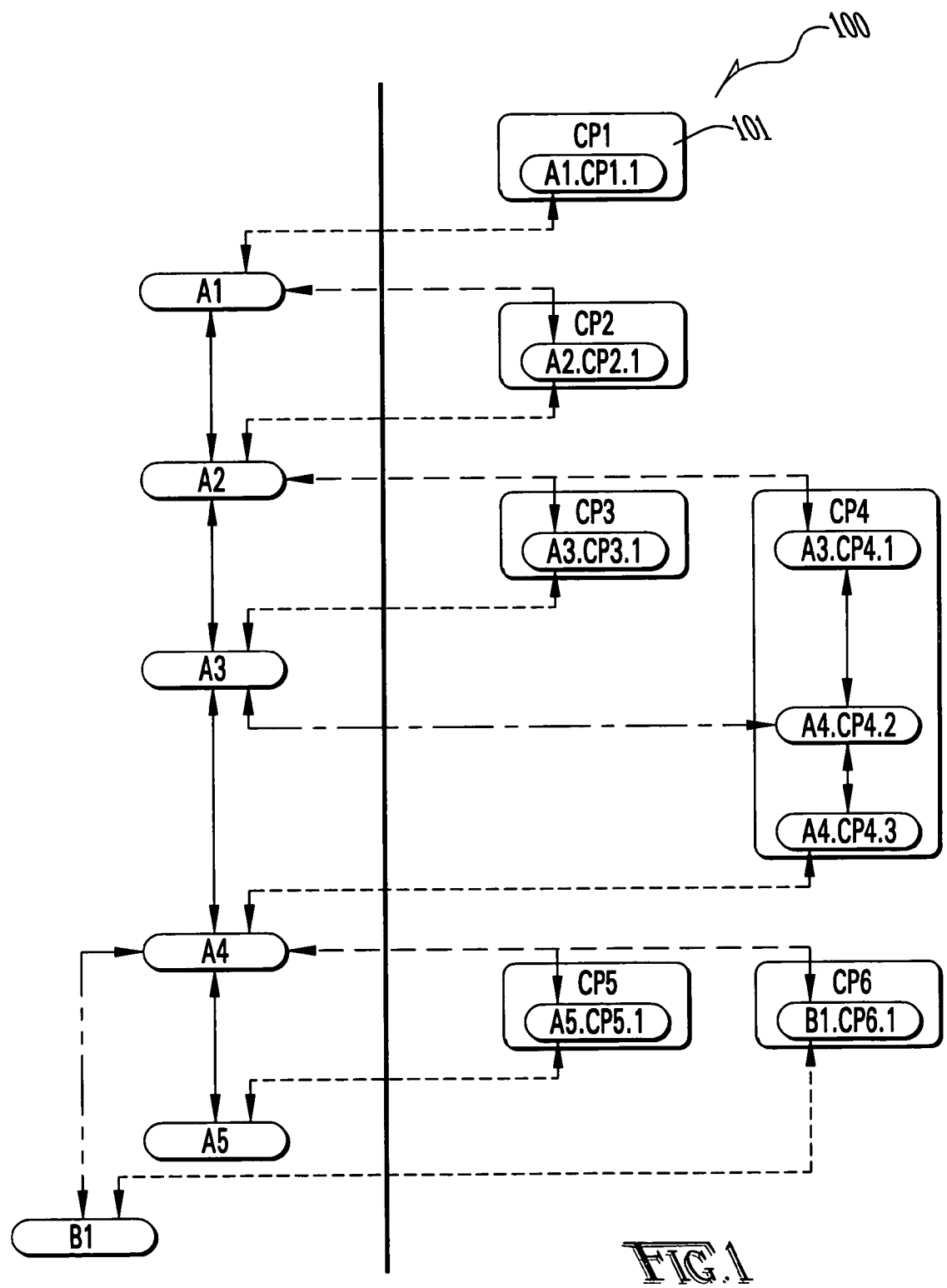
FIG. 1 is a simple flow chart of a genealogy of a change package or workspace of the present invention, where the bold lines with the filled arrow heads point to the Next version, the bold lines with the open arrow heads point to the Previous Version, the bold lines with two adjacent intermediate dots with the filled arrow heads point to the Derivative, and the bold lines with two adjacent intermediate dots with the open arrow heads point to the Derivative From, the bold intermittent line with the filled arrow heads points to the Change Start, the bold intermittent line with the open arrow heads points to the Change Start Source, the narrow lines with the filled arrow heads point to the Next Checkpoint, the narrow lines with the open arrow heads point to the previous check point, the bold lines with a single intermediate dot and with the filled arrow heads point to the Merge Target, the bold lines with the single intermediate dot and an open arrow head points to the Merge Source, the dotted line with the filled arrow heads points to the Publish Target, and the dotted line with the open arrow head points to the Publish Source. The bold ovals refer to the initial version, while the non-bold ovals refer to the Revised version; the large non-bolded smooth cornered rectangles refer to Change Packages.
Figure 2:
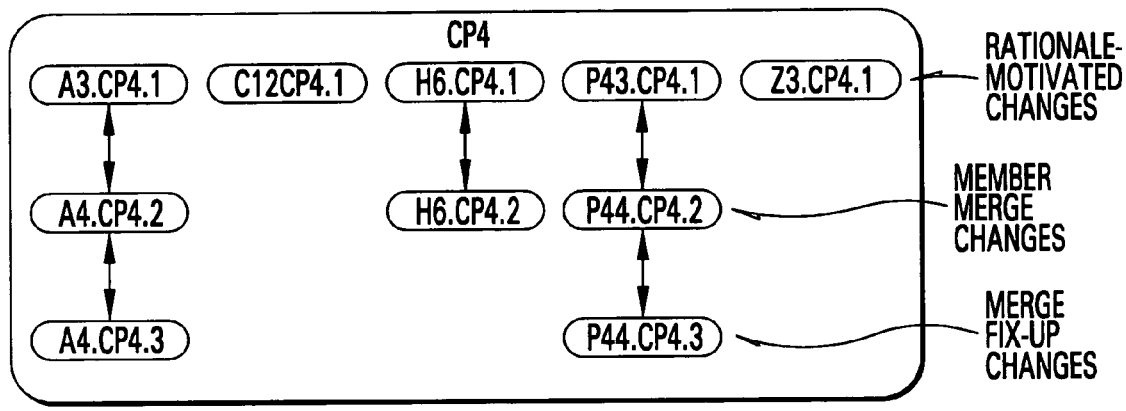
FIG. 2 is a flow diagram of a Change Package; the same labeling scheme as used in FIG. 1 is utilized.
Figure 3:
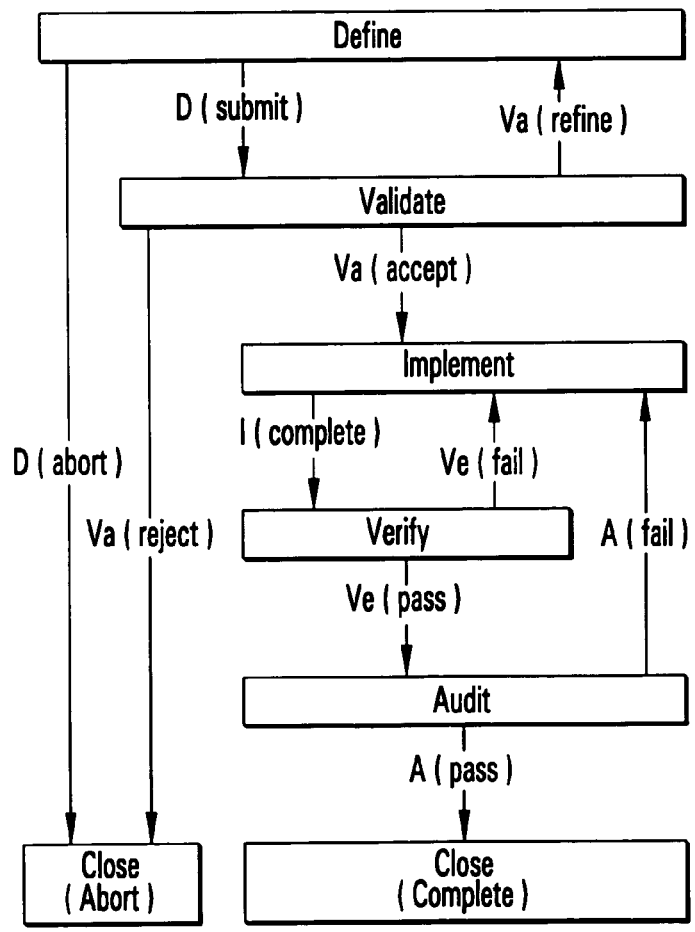
FIG. 3 is a flow chart of the basic change process of the present invention.

The present invention may be better understood by now referring to this detailed description of the present invention and to the Figures, where like numerals refer to like matter throughout. FIGS. 1–3 and their accompanying text relate to a general discussion of the present invention. FIGS. 4–9 and their accompanying text give a more detailed discussion relating to how a change package is created.

Before referring to FIGS. 1–3, a brief general explanation will be given to place the present invention in context. Configuration management (CM) is an important feature of many applications built on top of ODBMSs. This is particularly true for engineering applications such as CAD and CASE, which are used to concurrently and incrementally evolve database-resident models.

Concurrent Development

Concurrent development is characterized by more than one individual contributing to the model at the same time, often for different purposes, sometimes collaboratively in support of the same purpose.

One key aspect of the present invention regarding supporting concurrent development is change isolation. Change isolation means that each model contributor's changes are invisible to (isolated from) public viewers and other updaters until such time as the changes are deemed wanted (validated) and correct (verified), often by some controlling body other than the updater.

Typical prior art database applications implement a time-sharing strategy utilizing readily available and database supported locking. Locking ensures that only one contributor is allowed to make changes at a time. The problem with this approach is that one at a time, or conversely no two at the same time, does not constitute concurrency. The appearance of concurrency can be achieved if locking duration is reduced such that contributors are taking turns fast enough that neither one notices any delay. The problem is that change isolation is sacrificed. Without change isolation, each contributor's changes are immediately applied to the public view, and hence are available for others to build upon. The result is that contributions from multiple individuals become interleaved, and sorting through all changes, accepting some, while rejecting others, becomes extremely difficult.

While time-sharing can be implemented using known object-oriented database locks, such as Objectivity's short and long locks, true change isolation requires something more substantial. The present invention uses versioning. In a simple sense, versions are merely copies that have a few relationships between them for management purposes. The present invention provides full isolation by having each contributor make his or her changes to separate copies (versions) of the same item. Since each contributor's changes are made against different objects, there is nothing preventing them from making changes at the exact same time. Moreover, with the present invention, there is no unwanted interleaving of changes. Because each contributor's changes are applied to separate copies, each may be individually reviewed, reworked, accepted, or rejected. Iterative development is typically employed when the final solution is not known all at once, but is revealed slowly. In a typical engineering environment, changes are made, reviewed, tested, accepted, and rejected one after another until such a time as a deliverable answer is found. During iterative development, with the present invention, baselines (read-only versions) are made that capture the state of the model at different points in time and serve many purposes:

Capturing history

The system and method of the present invention have baseline versions which are collected in a graph structure called a genealogy (FIG. 1). The genealogy represents the evolution of versions and as such can be very telling of what changes the item has gone through. Specifically, the questions of who, what, when, and why are answered.

Who:

Each version in a genealogy is created in the name of a change package (CP) and has an association to it. A change package is a collection of changes made for the same purpose and records all persons involved during its execution. It can then be learned who was responsible for the generation of any version by examining the associated CP.

What:

Differences between any two versions in a genealogy can be calculated at any time. The difference between two subsequent versions represents what was changed on the first version to create the second version. Calculated differences are a vast improvement over manually maintained change logs. Manual logs double users' entry effort by requesting them to both make and describe changes. Calculated differences are guaranteed accurate and do not require double entry effort from users.

When:

With the present invention each version is time-stamped. Depending on the version's purpose, the time stamp may represent when an isolated change effort began, when a checkpoint was made, or when changes were completed and published.

Why:

The CP contains the rationale for the changes as a textual description provided when the CP is created.

Creating Checkpoints

Checkpoints are baselines that can be recovered in order to back out changes.

Sharing

Component sharing is a tenuous arrangement. Two or more users may agree on a component's definition at one point in time, later disagree, and yet later agree again, and so on. During disagreement, there is actually more than one version in the component's genealogy being used at the same time. When users of older versions promote their use to the newest in order to take advantage of all changes made, agreement is reestablished. So long as agreement may be reestablished, a new version extends the previous version's lineage. As soon as agreement can no longer be reestablished, a new version begins a new lineage.

Releasing

Baselines can be used to correlate to internal or external releases. These baselines will often have a part number applied. It then becomes possible to track down the exact data used to produce a product in the event of product failure, and begin new development based upon an older release.

A genealogy is a tree structure of versions where leaves represent the latest-versions, and all other versions are kept for historical, checkpoint, release correlation, and component sharing purposes. There is more than one leaf version only when there is more than one lineage. In the example, there are two lineages: A and B. Each leaf, and its lineage, represents the evolution of a separate and distinct configuration item (CI). In prior art ODBMS, such as Objectivity, a well-known commercial of the shelf ODBMS, with supported versioning, a lineage is created using linear versioning and a new lineage is introduced using branch versioning.

It is important to understand that in the example given of the present invention, changes are not directly applied to versions within the genealogy; instead, they are made to versions within change packages. This arrangement provides the change isolation necessary for concurrency. Versions within the genealogy are public, meaning that they are available for viewing from all views (public or change package) and are available for new use by all change packages. If changes were made to the genealogy versions, then all views would be simultaneously updated, and contributors would become bombarded with each other's changes. There would be no way to prevent one contributor from building upon incorrect and/or incomplete changes made by another.

A more thorough understanding of the method of the present invention may be obtained by now referring to FIG. 1, where there is shown a genealogy of a change package 101 using the ODBMS, generally designated 100, and method of the present invention.

In order to more fully support the isolation of changes, the change package itself may maintain a map or dictionary of public items that are shared (owned) by items that have been copied into the change package. Each entry in this map contains a list, each entry of which contains the two pointers that the public item would normally hold itself—one for the context, the other for the direct owner. Keeping this map in the change package itself avoids modifying public items when sharing is initiated by versioning their owner into the change package. For simplicity, the following description and drawings show the changes being made directly on the public items, but in the preferred implementation, they are actually made in this map. This technique is desirable because it allows concurrent access and versioning of public items into separate change packages without lock conflicts.

The genealogy starts when CP1 creates A1.CP1.1, sets all values as desired, and publishes it as A1, an initial version.

The genealogy is extended when CP2 creates a version of A1 (A2.CP2.1), makes changes to A2.CP2.1, and then publishes it as A2. Publication in this case entails making a version that is a copy of A1—the latest in the genealogy at this point, and then applying changes made within the CP. Changes are determined by calculating the difference between A1 and A2.CP2.1.

Both CP3 and CP4 use A2 as their change start source. (This is now true concurrency; both are effectively changing the same version (A2) at the same time without affecting one another—at least until publication time.) Since CP3 is the first to publish, its process is the same as was for CP2. But CP4 has a problem; CP3 has created A3, which is different from CP4's change start source. If CP4 were to publish in the same manner as CP3 had, then CP3's changes would be lost; A4 would replace A3 as the latest, but not contain any of the changes contributed by A3.

The solution is to first merge A3 (containing CP3's changes) to CP4 before publicizing CP4. That way, CP3's changes will be preserved when CP4 publishes. A3.CP4.1 is made into a checkpoint version, and merge changes are applied to a new version (A4.CP4.2). A checkpoint version is necessary here because the purpose for changes has changed; originally, changes were made according to the CP's rationale, but now they are being made to perform a merge.

Merging is accomplished by comparing the changes made from the change start source version to the latest (A2 to A3) with the changes made in the CP (A2 to A3.CP4.1). Identical changes or those affecting different areas are considered trivial and are applied to A4.CP4.2 automatically. Changes not in agreement are considered non-trivial and require user-directed resolution. For each non-trivial change, the user must choose one of: the change start source's (A2) value, the latest version's (A3) value, the CP's (A3.CP4.1) value, or provide a new value. For historical purposes, the user's decision is recorded as a resolution object attached to the merge target (A4.CP4.2).

The merge process thus far is performed on a member-by-member basis. Sometimes, though, mixing two sets of changes will require random changes that go beyond member-by-member choices. When this is the case, the merge target is made a checkpoint version, and the random changes are applied to a subsequent version (A4.CP4.3). A checkpoint version is again necessary, as it is important to separate random changes (that may go beyond a reviewer's expectations) from those restricted to conflicting members.

Differences between the change start source version and the different checkpoint versions within the CP communicate to reviewers all that has been done and for what purpose. They can see all changes made in the name of the CP's rationale (A2 to A3.CP4.1), to merge member-by-member (A3.CP4.1 to A4.CP4.2), and to finish the merge (A4.CP4.2 to A4.CP4.3).

It is worth noting at this point that only one CP can publish at a time, and that merging for the purpose of enabling publication is considered part of publication. This restriction is provided to assure a publication effort will actually be able to finish without going through several iterations, each caused by some other CP getting their changes in first. Iterations in publication must be avoided as publication is made a relatively expensive process by involving reviewers in addition to the change contributor.

The situation expressed by CP5 and CP6 looks similar to the merge situation of CP3 and CP4 in that both CP5 and CP6 have the same change start source, but is very different because CP6 has declared its version (B1.CP6.1) to be an initial version. As a result, publication of CP6 creates B1 in the genealogy as a derivative of A4, rather than the next version of A4. Like A1 originally created in CP1, B1 begins a lineage that is separate and distinct from all others. Contributions to A's lineage, like that of CP5's A5, are of no concern to the new B lineage and do not need to be merged.

A better understanding of the present invention may be obtained by considering an example. First is that prior to publication, users can initiate checkpoint versions within a change package at their discretion. Second is that they can request a merge outside of the publication process. Note that because the merge is outside of the publication process, there is no blocking of publication by other CPs. Lastly, a change package can be made to behave as an intermediate public area by having nested CPs that publish to it, rather than to the public genealogy.

Change Packages

A change package (CP) is a collection of changes made for the same purpose. The purpose is recorded in the change package as a user provided description and/or reference to external change management issue (SCR, PR, etc.).

Now referring to FIG. 2, there is shown a CP4 used in the genealogy evolution example, of the system and method of the present invention, but expanded to show that a CP can affect multiple CI lineages; in the example: C, H, P, and Z, in addition to A.

Notice that C and Z do not have checkpoint versions for merging. (This is because for those CI's, merging was not required. And notice that H does not have a checkpoint version for fix-up. This is because for H, member merges were sufficient, and no fix-up was required.)

In ordinary usage, it is highly unlikely that a CP will contain versions sourced from all lineages. Publicly, all lineages are available and represent contributions from all previously published CPs. Instead, versions are only made for those lineages the user explicitly requests. The user does this by "checking out" CIs before modifying them. Two things happen the first time a CI is checked out: first, a version is made based on the latest public version and placed in the change package, and second, the new version is marked reserved to the individual making the checkout request. The CI is then read-only to all others working in the same CP until that person (or an administrator) checks the CI back in. Checkouts subsequent to the first and prior to merging or checkpointing only affect reserve state and do not create a new version.

(Note: Many prior art OTS CM systems create new versions for each checkout automatically. This was not done in the present invention in order to keep reserving and checkpointing separate actions. Further motivation results from increased difficulty encountered when dealing with multiple versions of interdependent CIs.) In the present invention, checkpoints are created at user request and are CP wide. Note that checkpoint requests do not immediately result in new versions of the entire CP's CIs; rather, new versions are created only for those versions that are checked out again.

At initial checkout time, the user chooses whether or not the new version begins a new lineage. If so, it is derived from the source version instead of becoming a new latest of it. If not, the decision to have a version start a new lineage can still be made up to and including the point of merging, where the decision might be used to resolve merge conflicts. The one caveat, though, is that once a version is made the start of a new lineage, there is no easy way back. The only recourse is for the user to move all current uses of the new lineage to the old, delete the new lineage, and re-checkout as a latest.

Now referring to FIG. 3 there is shown a high level functional flow process diagram which describes in general a change process. The use of auditors and other matter disclosed in this FIG. 3, relate to a particular use and environment for the present invention and it is not the intention that the present application be construed to be limited by anything shown therein.

With respect to FIGS. 4–9 discussed in detail below:

Configuration Items

Configuration items (CIs) are objects under configuration control and come in two varieties: model and model folder. A model correlates to a typical CM system's file, and a model folder correlates to a typical CM system's directory (or folder).

A CI is the smallest item managed by the CM system. How small or large, or at what level of abstraction in the model domain varies from system to system. The general guideline is that anything that needs to be individually managed needs to be a separate CI. Motivations for making an item a separate CI include correlating the item to internal or external products, and enabling the item to be reused.

From the perspective of this paper, anything that is separately maintained and contains meaning is a model. This is irrespective of the CI's level of abstraction. Items that are used to organize models and that do not contain meaning are considered model folders.

Model CIs

Models are the real CIs of interest, containing all information necessary to represent (or reproduce) products. For example, if the database were to be used to store C++ program models, then there will be models representing classes that can be used to generate an executable. Classes are made separate model CIs rather than simply making them part of an owning program to enable reuse across programs. A program made up of various classes is represented as a program model CI that is client to various class model CIs.

This example has exposed the fact that there are often dependencies between model CIs. A program model CI is dependent upon the classes that compose it. A class model CI is dependent upon other class model CIs that it inherits from, composes, or uses within one of its methods. Such dependencies are of great interest to version management; for example:

For a depending CI to be effectively baselined, all depended-upon CIs must be baselined prior to or at the same time. In the example, all classes a program uses must already be baselined or be baselined with the program. This is accomplished by keeping all editable versions in CPs, not allowing CPs to use one another (except for nested CPs that can see their enclosing CP's work), and forcing CPs to baseline (checkpoint or publish) all of their changed CIs at the same time.

When a checked-out CI is chosen to be the initial version of a new lineage, users must choose for each checked-out CI dependent on the source CI whether to continue to use the old lineage or switch to the new one.

Model folder CIs

Model folder CIs are simple in that they are used to list CIs and other model folders, and nothing else.

Model folders are not and cannot be model CIs themselves, and model CIs are not and cannot be model folder CIs. Keeping the organization of models, which model folders provide, separate from the models goes beyond a need for conceptual simplicity. How a model is organized cannot affect its meaning; if it did, the organizing mechanism (the model folder) would be part of the model and versioning of the model would require versioning of the model folder. Conversely, what a model means cannot be tied to what it organizes, or else the model and all the models it organizes would have to be versioned together as one. But they must remain separate to be valid CIs. Without these rules, version boundaries are uncontrolled and can result in nearly the entire database being copied in order to produce a single version.

A big difference between model folder CIs and model CIs is how copying for the purpose of versioning is performed. Shallow copying is used to version a model folder and new versions simply alias model CIs from the old. On the other hand, modified deep copying is used to version model CIs. Modified refers to the fact that only affected model component objects and their direct owners up to the model CI object are actually copied. All others are aliased. Using a modified deep copy rather than simply using a deep copy is a major performance boost when working with large composite model CIs.

Because model folder CIs are used purely for model organization and do not carry meaning, their genealogies are restricted to a single lineage. Users are not given the opportunity to designate a checked-out model folder as a new lineage as they are with model CIs. For the same reason, merging is always trivial and automatic. Users are never bothered with making merge decisions.

Views

The job of a view is to select one and only one version from each genealogy in the database. For the public view, all the latest in the genealogy are chosen. For a CP view, the latest checkpoint version is chosen for checked-out CIs and the latest in the genealogy for those not checked out.

There is but a single lineage of Top folders, the latest providing the public view. Each CP gets its own checked-out version of the latest Top folder when it is started, providing each CP a private view.

The heart of this invention provides a method for efficient sharing of unchanged objects. In the preferred implementation, one particular object and two types of objects play critical roles:

1. The Top object provides the overall view of the system at a particular time;
2. Instances of Model CIs correspond to real-world products;
3. Model Components represent pieces of Models. They are owned by one or more versions of one and only one model. A Model and all of its owned Model Components constitute a single composite object.

While the user navigates the hierarchy from Top, down through one or more Folders to a Model to Model Component, a Context object stores up to three pieces of the navigation path. Navigation of an OODB starts at the Top object. Top is the starting point, the owner of all objects for the system. Top provides the overall context, so the Context object saves it. Navigation proceeds through Folders, which are not saved. When the user navigates to a Model, the Context object saves it as it provides the context for resolving sharing of Model Components. Further navigation down the Model Components causes saving of the current Model Component, but no other Model Components.

Model Components store two pointers for each of their owners:

1. The Model Component that owns them;
2. Their owning Model, or, if the Component itself is owned directly by a Model, then only the Model is saved.

When the correct owner of a Model Component is needed, and the Component is shared, the Model provided by the Context object can be matched with the Model pointer in the list of owners stored by the Model Component. Since the navigation path proceeded down through only one Model, and arrived at the Model Component, one of the Model Component's entries must have a Model pointer matching the Model pointer in the Context object. That is, unless the Model Component is owned directly by versions of a model, in which case one of the Model Component's owners will match the Model part of the Context object.

The details of how a CP is performed and how it is different from the Park 1 and Park 2 references can now be better understood by referring to FIGS. 4–9. In general, the Park 1 and Park 2 references describe an ODBMS which requires that a table of references be generated that contains a reference to every component of a complex object irrespective of whether those components have been changed. The present invention requires only the copying of the desired component and all of the objects which own it up to the top level. It is believed that a thorough reading of the above general discussion and the detailed distinctions below will provide more than enough information to a person skilled in the art to make and use the present invention. This person skilled in the art will be presumed to understand the prior art, including but not limited to the Park 1 and Park 2 references.

Figure 4:
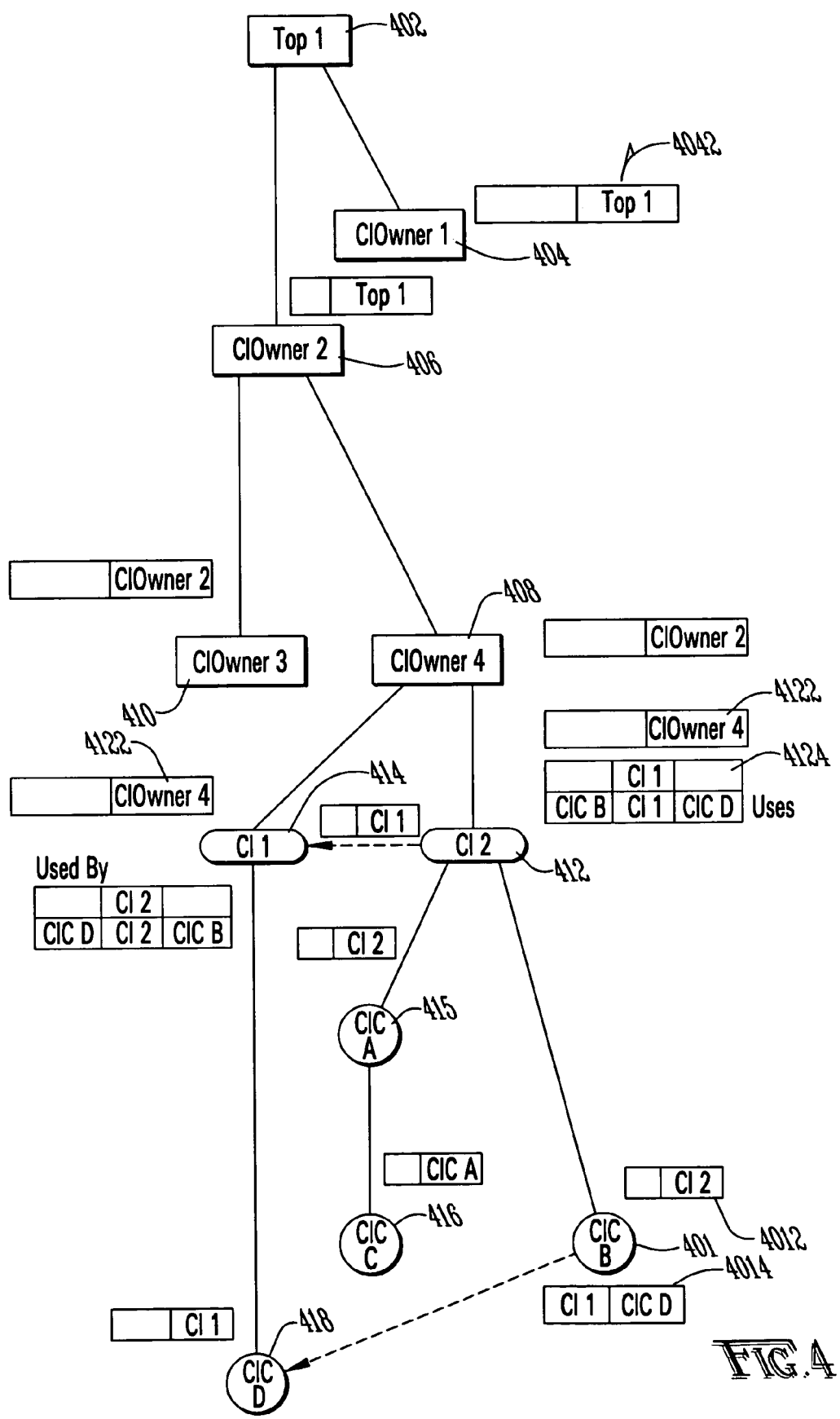
FIGS. 4–9 are successive detailed graphic depictions of a process of the present invention of creating a change package with new versions to be edited. The solid lines refer to ownership, the lines with intermediate dots refer to obsolete sharing, the dotted lines refer to references or used by, and the intermittent lines refer to Next/Previous versions. Bold lines combined with any of the previous patterns indicate lines that are added or changed in the drawing in which they appear.

Now referring to FIG. 4, there is shown Step 1, of a detailed 16 step process of showing how a model CI component (CIC), which is to be edited, is handled, by creation and population of a change package with the desired model CIC to be edited and other model CIs and model CI folders which own it. The term "own" is used herein in the context that a first object "owns" a second object if the second object is a component of or is included as a part of the first object. If the relationship between the two objects is that they merely have some reference to each other or some or even numerous similarities between them, then this is not considered as one object "owning" another. In the following example, the item to be edited is CIC B, and the objects owning it are the CIs and CI Owner folders directly above it in the chain of FIG. 4.

FIG. 4 shows a snap shot in time of the relationships relating to CIC B and its owners. Each CI and CI folder (except the TOP folder) includes at least one reference list associated with it which lists the relationships of the object with others, such as who owns that object, references from that object to other objects, new and previous versions of that object, and obsolete sharing. The Top 1 folder 402 owns two folders CIOwner 1 folder 404 and CIOwner 2 folder 406. CIOwner 1 folder 404 is shown having a reference list 4042 which lists therein "Top 1" to indicate that its owner is Top 1 folder 402. Similarly, CIOwner 2 folder 406 is shown having a reference list 4062 which lists therein "Top 1" to indicate that its owner is Top 1 folder 402. CIOwner 4 folder 408 includes in its reference list 4082 a reference to CIOwner 2, to indicate that CIOwner 2 folder 406 owns CIOwner 4 folder 408. Also shown is folder 410. CIOwner 4 folder 408 owns two CI models, CI 1 model 414 and CI 2 model 412. CI 2 model 412 has two reference lists. One reference list 4122 indicates that CI Owner 4 folder 408 owns it, the other reference list 4124 indicates that CI 2 model 412 uses CI 1 model 414. Both CI 1 model 414 and CI 2 model 412 are shown having identically numbered reference lists 4122, which both indicate that they are owned by CI Owner 4 folder 408. The object to be edited, CIC B model 401 is shown with reference lists 4012 and 4014. Reference list 4014 shows that CIC D model 418 is used by CIC B model 401. FIG. 4 also shows CIC A model 415, and CIC C model 416.

Figure 5:
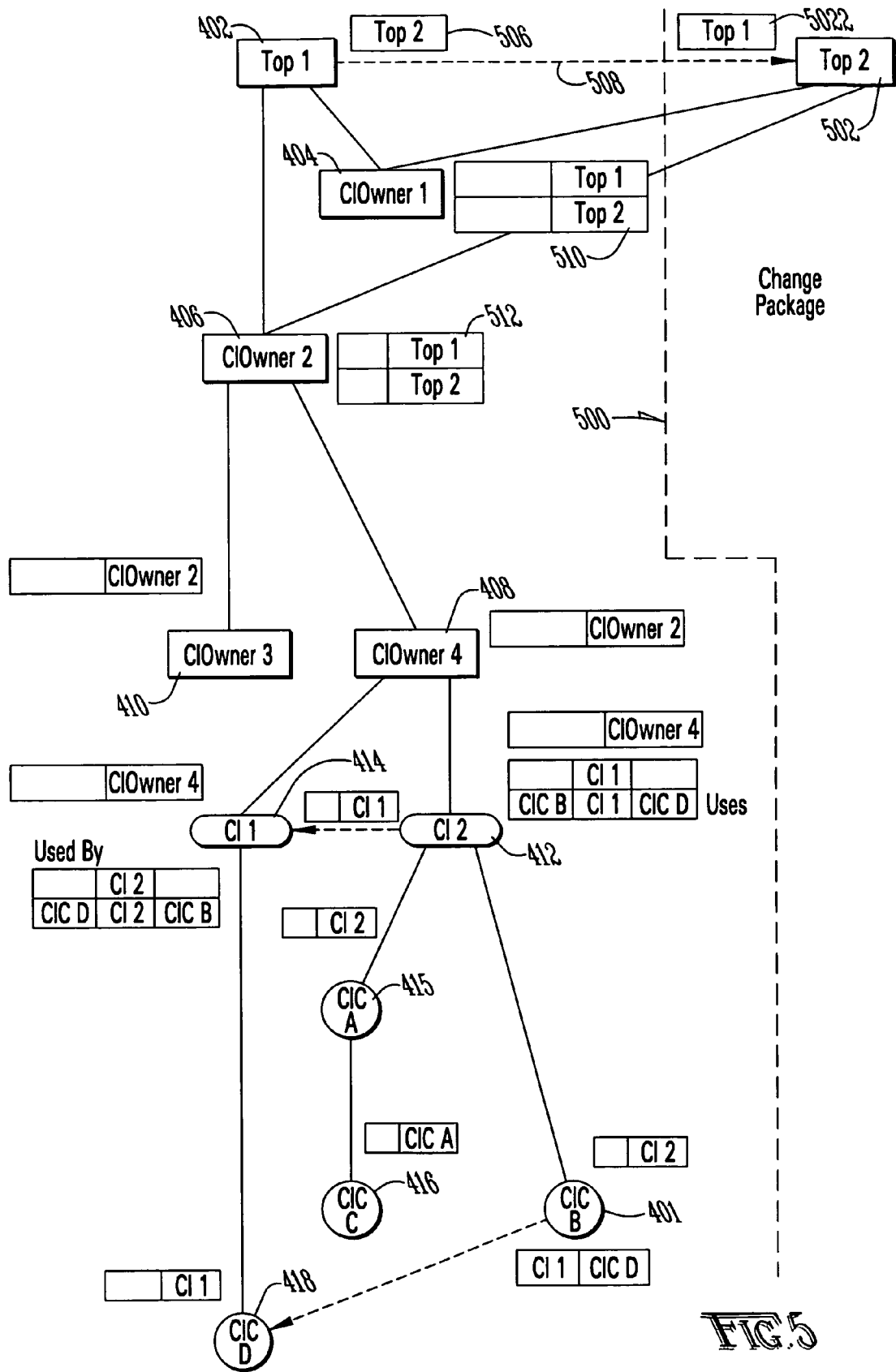

Now referring to FIG. 5, there is shown the next step in the process of the present invention of creating and populating a CP so as to allow editing of CIC B model 401. Recalling that like numerals in the figures refer to like matter, FIG. 5 is very similar to FIG. 4, except for a few important distinctions. CP 500 is shown as a box made of an intermittent or dashed line. CP 500 includes a copy of Top 1 folder 402; it is labeled as Top 2 folder 502. Reference table 5022 indicates that Top 2 folder 502 has a previous version in Top 1 folder 402, which now has a new reference table 506 which, along with the dashed line 508, indicate that Top 2 folder is a next version of it. In general, this FIG. 5 indicates that the user of the present invention has requested to create a CP. Also shown in FIG. 5 are reference tables 510 and 512, which are different from reference tables 4042 and 4062, (FIG. 4), in that they now indicate that both of these CI Owner folders 404 and 406 (FIG. 4) are now owned by two separate top folders Top 1 folder 402 (FIG. 4) and Top 2 folder 502.

The next step of the present invention is for the user to navigate to CI Owner 2 folder 406 (FIG. 4), followed by navigating down the chain through CI Owner 4 folder 408, CI 2 model 412 and finally to CIC B model 401. The next step for the user after having navigated to CIC B model 401 is to select it to be edited. The program of the present invention then performs a few tasks. First the program checks to see if CIC B model 401 has a version in the CP 500; it is not in the CP, so the program continues up the chain through CI 2 model 412, CI Owner 4 folder 408, CI Owner 2 folder 406 up to Top 2 folder 502 until it determines that it exists in the CP 500.

Figure 6:
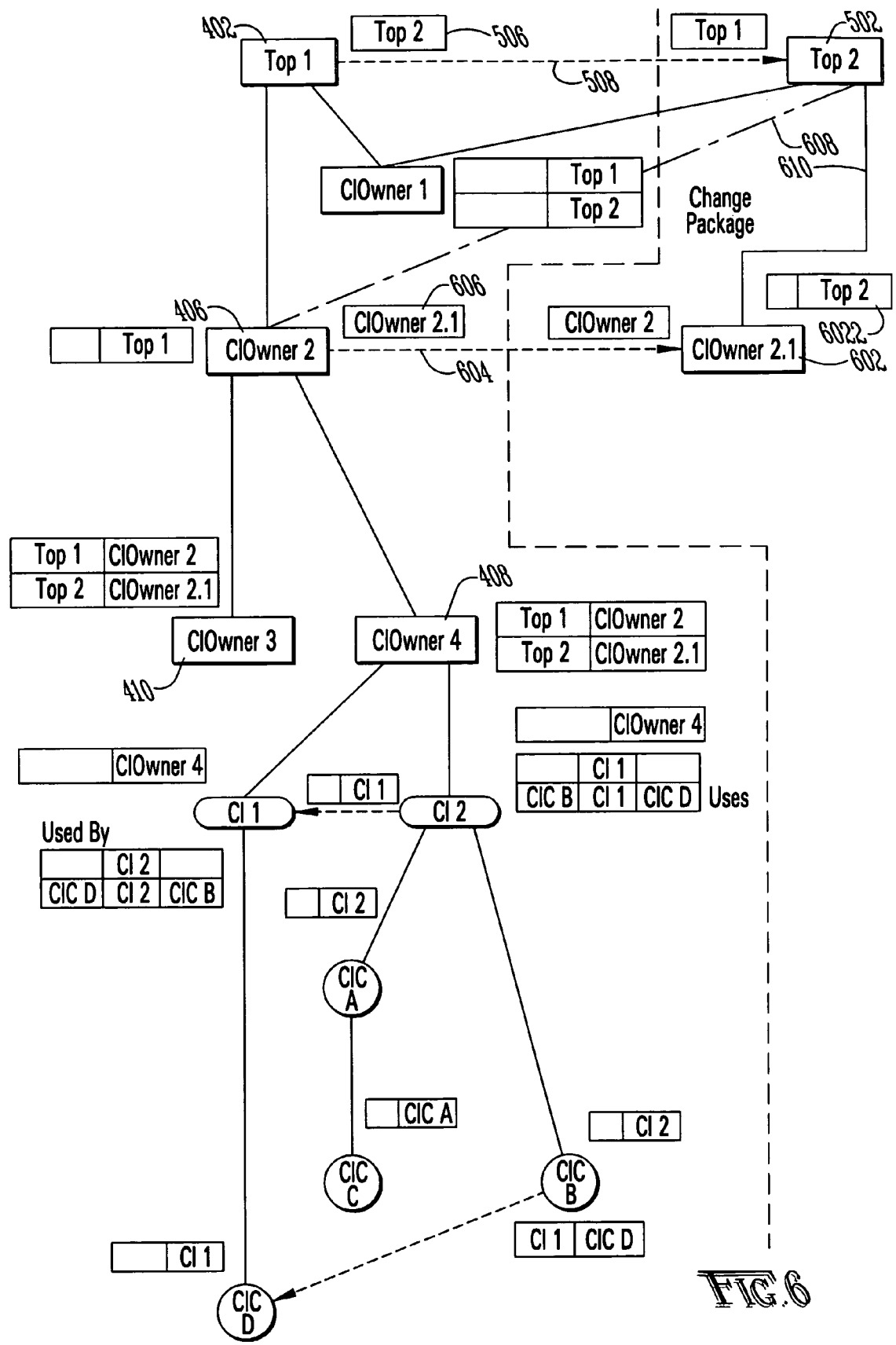

Now referring to FIG. 6, the program of the present invention then creates a new folder 602, which is labeled CI Owner 2.1 and is a copy of CI Owner 2 folder 406. The reference table 6022 indicates that this new folder 602 is owned by Top 2 folder 502. Reference table 6024 indicates that a previous version of folder 602 exists in CI Owner 2 folder 406. This relationship is also indicated in FIG. 6 by dashed line 604 and by the reference table 606, which shows CI Owner 2.1 folder as a next version. The dashed and dotted line 608 extending between Top 2 folder 502 and CI Owner 2 folder 406, indicates an obsolete sharing because of the fact that a new version of folder 406 has been created in the CP, and the sharing is no longer required. Solid line 610 from Top 2 folder 502 to CI Owner 2.1 folder 602 indicates ownership between the two, thereby rendering the earlier sharing relationship obsolete.

Figure 7:
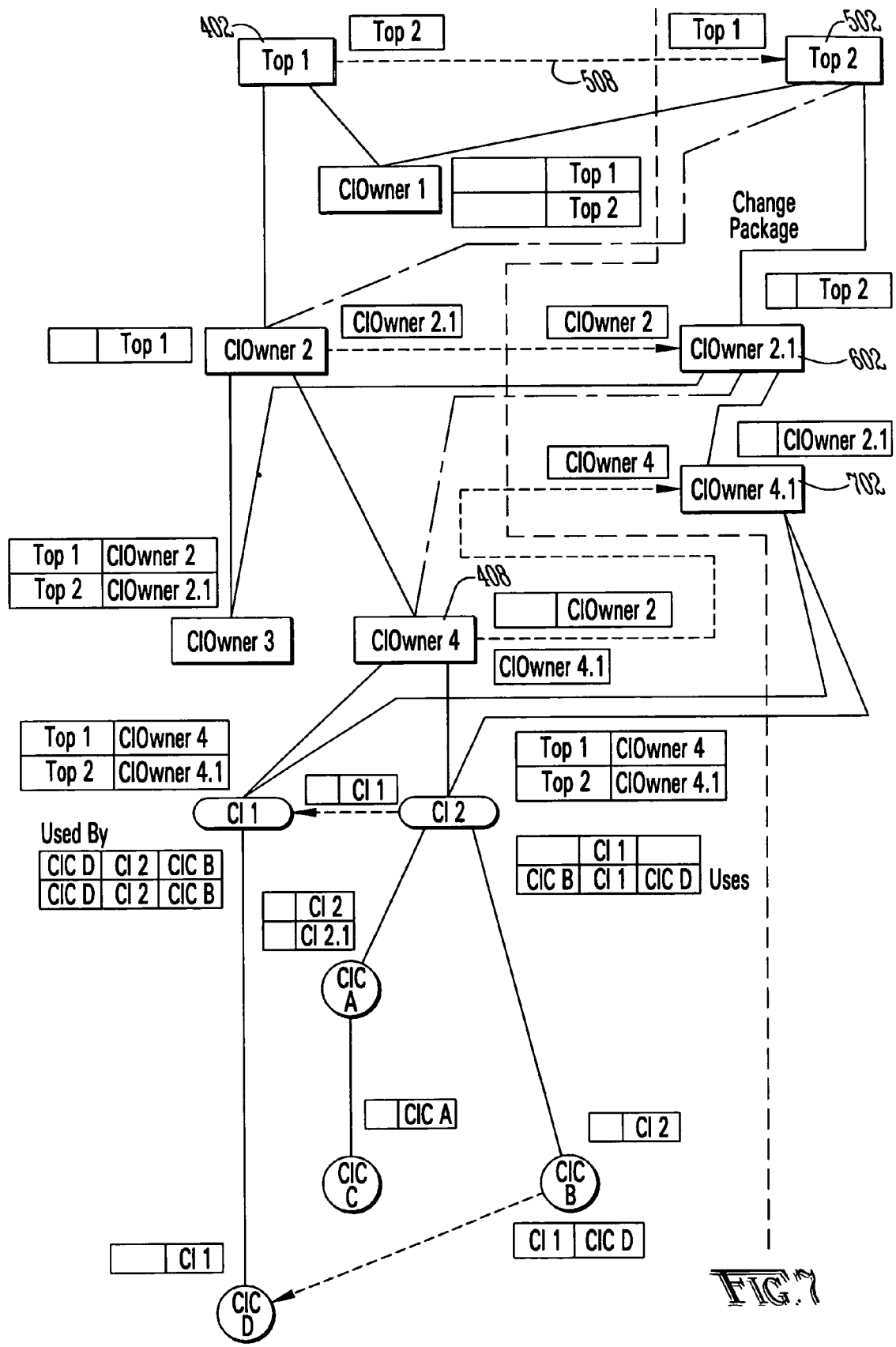

Now referring to FIG. 7, there is shown a snap shot of the CP, after the software program of the present invention, without a requirement for additional user intervention, has created a new folder 702, which is labeled CI Owner 4.1 and which is a copy of CIOwner 4 folder. Similar to FIG. 6 above, the relationship between versions is shown, the ownership between folders 602 and 702 is shown, and the now obsolete sharing or aliasing between folder 602 and 408 is indicated.

Figure 8:
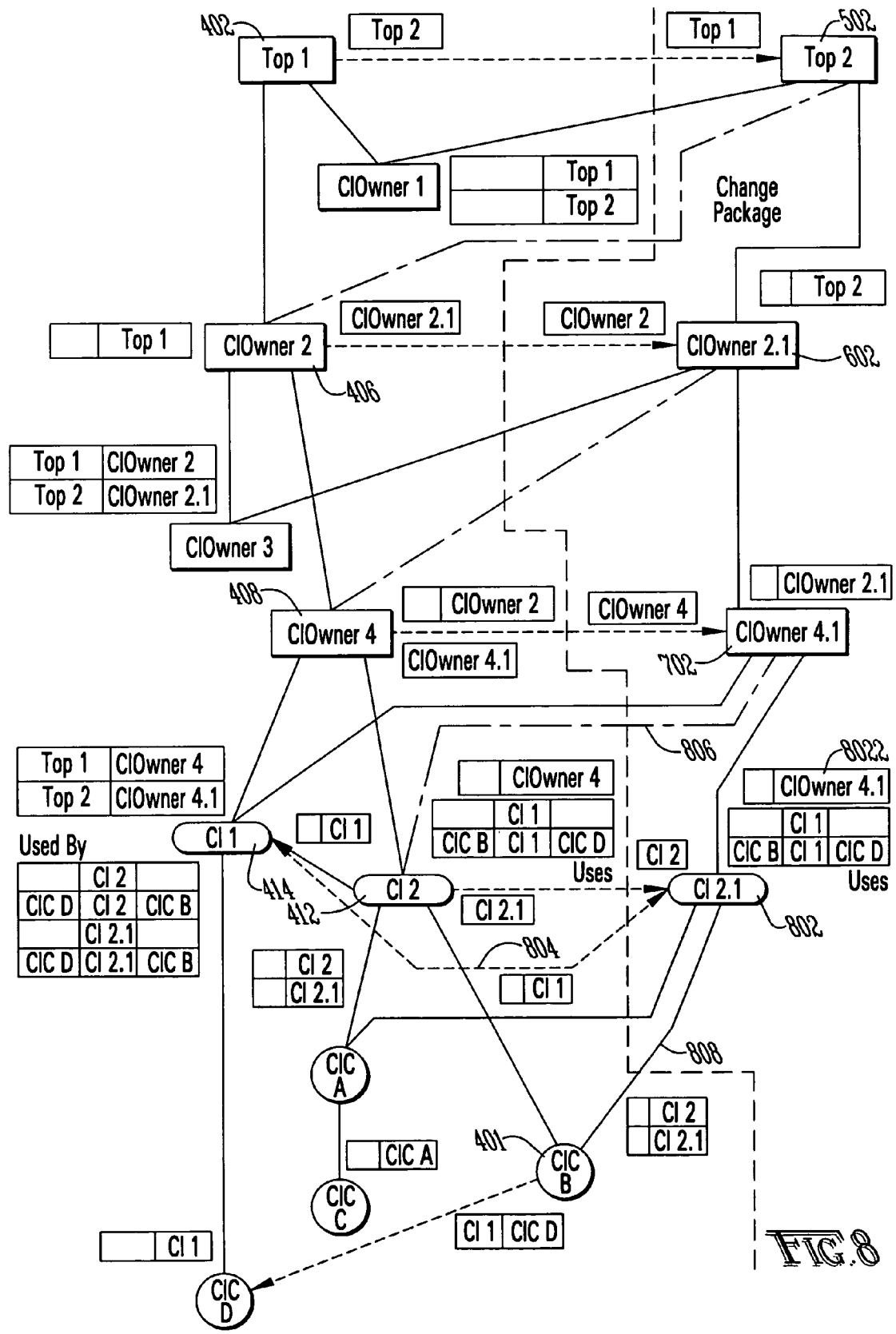

Now referring to FIG. 8, there is shown a next stage snap shot of the CP, after the software program of the present invention has created a new model 802, which is labeled CI 2.1, which is a copy of CI 2 model 412. The appropriate reference relating to CI 2 model 412 is also automatically addressed without a requirement for user intervention. Lines 804, 806, and 808 indicate uses, obsolete sharing and ownership respectively, in a manner similar to FIG. 7 above. Reference tables 8022 and 8024 are also included.

Figure 9:
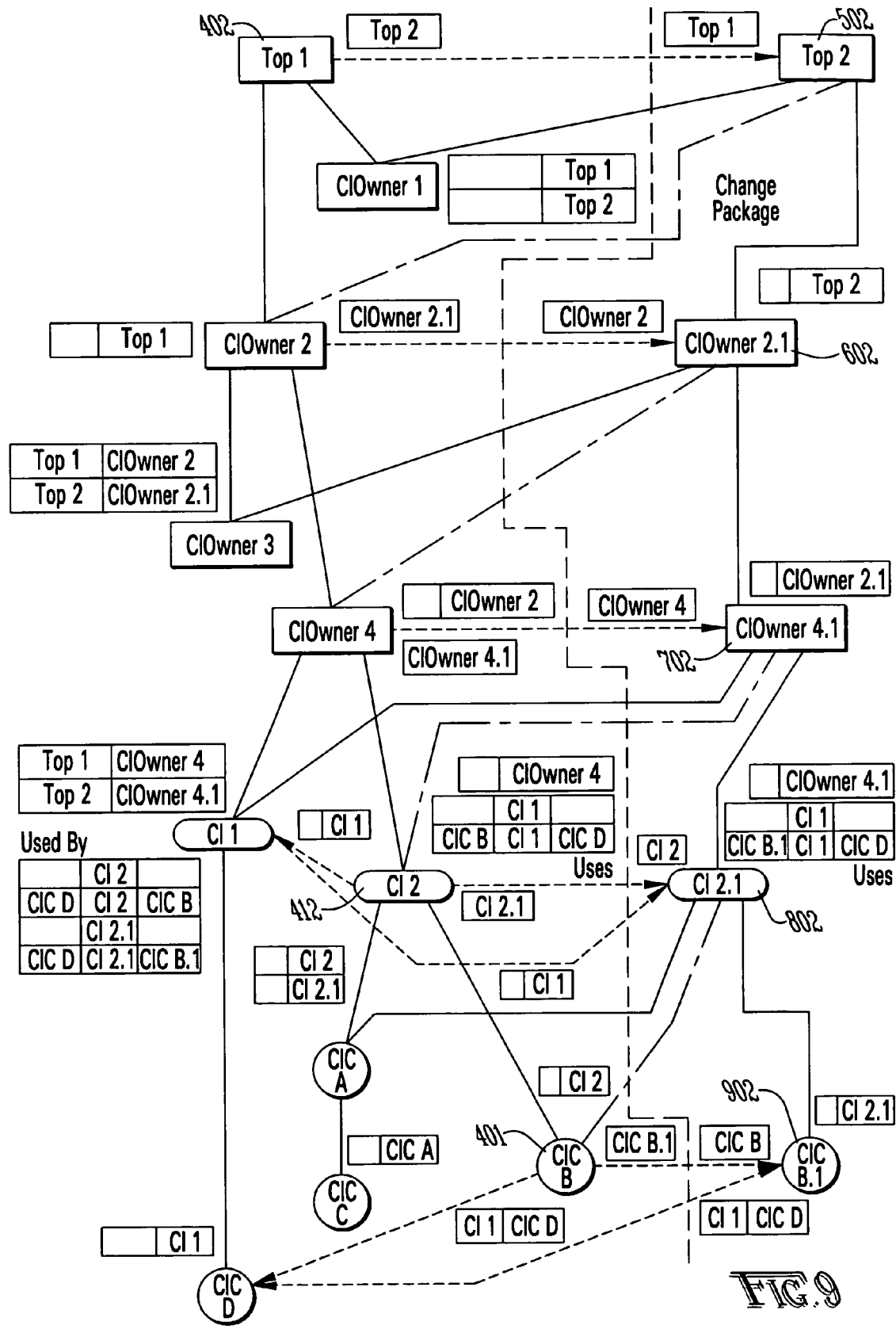

Now referring to FIG. 9, there is shown a final configuration of the process of editing CIC B 401. There is shown a new model component 902, which is labeled CIC B.1, which is a copy of CIC B model 401. Other relationships are shown in accordance with the scheme described above. The user is now capable of "making edits" to CIC B 401, in the CP 500. As described above in the general discussion, changes are not actually made to CIC B 401, but to its copy in the CP 500. It should be noted that CP 500 includes CIC B.1 and all of the objects which own it. All other objects which are owned by Top 1 folder are aliased or shared. This sharing provides for an important advantage of the present invention, which is that there is no requirement to either copy every component of a composite object, nor is there a requirement that a reference table be made for each of the components under the composite (Top 1 in the present example) irrespective of whether a change has been made or not. The present invention is believed to be most beneficial when the database contains many small objects. It is in such situations that the advantage of copying only the direct ownership links and sharing the rest become the most beneficial, especially in comparison to the Park 1 and Park 2 prior art methods.

Throughout this description, reference is made to program, software program, system and method of the present invention. No reference has been given to the particular language which is used to create these functions. It is believed that the programming language of C++ is the best, but others could be used as well. The details of programming language, operating system, and computer hardware are a matter of designer's choice, and it is expected that different designers will make varying choices with respect to such matters.

Irrespective of such choices, the system and methods of the present invention should be understood from the foregoing description, and it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. A system for assisting a user with configuration management comprising:
   an object-oriented database management system containing a plurality of configuration items;
   said object-oriented database management system having an ability for making changes to a predetermined configuration item of said plurality of configuration items;
   a copy of said predetermined configuration item is disposed in said object-oriented database management system, in response to a direct user intervention;
   disposed in the object-oriented database management system, a copy of each object which directly and by ownership through another owner, owns said predetermined configuration item;
   a shared ownership of other configuration items which have not been modified themselves and which are owned by said predetermined configuration item;
   wherein every object in said object-oriented database management system has as a component thereof a list of owners of said object.

2. A system of claim 1 wherein each element of said list includes a context characteristic for an owner of said object.

3. A system of claim 2 further includes reference relationships from a first object to a second object, which includes a context characteristic on an ownership characteristic of said second object.

4. A system of claim 1 further including:
a shared ownership of other configuration items which have not been modified themselves and which are owned by each object which directly and by ownership through another owner, owns said predetermined configuration item; and,
a workspace for making changes to said plurality of configuration items in isolation.

5. A system of claim 4 wherein the workspace contains said copy of said predetermined configuration item and a copy of each object which directly and by ownership through another owner, owns said predetermined configuration item.

6. A system of claim 5 wherein said shared ownership extends from inside said workspace to outside of said workspace, through the use of ownership lists for each item outside of the workspace which is owned by items in the workspace.

7. A system comprising:
an ODBMS having a plurality of configuration items therein, wherein said each of said plurality of configuration items is an object and includes engineering information relating to a predetermined engineering design;
said ODBMS having an ability for making changes to a predetermined configuration item of said plurality of configuration items;
a copy of said predetermined configuration item is disposed in said object-oriented database management system, in response to a direct user intervention;
disposed in the ODBMS, a copy of each object which directly and by ownership through another owner, owns said predetermined configuration item;
a shared ownership of other configuration items which are owned by said predetermined configuration item;
wherein every object in said object-oriented database management system has as a component thereof a list of owners of said object;
wherein said list of owners is capable of including multiple owners;
wherein each element of said list includes a context characteristic for an owner of said object;
reference relationships from a first object to a second object which includes a context characteristic on an ownership characteristic of said second object;
a workspace for making changes to said plurality of configuration items in isolation;
wherein the workspace contains said copy of said predetermined configuration item and a copy of each object which directly and by ownership through another owner, owns said predetermined configuration item: and,
wherein said shared ownership extends from inside said workspace to outside of said workspace, through the use of ownership lists for each item outside of the workspace which is owned by items in the workspace.

* * * * *